United States Patent [19]

Coleman

[11] Patent Number: 4,805,952
[45] Date of Patent: Feb. 21, 1989

[54] DETACHABLE VAN SEAT

[75] Inventor: Jack E. Coleman, Mishawaka, Ind.

[73] Assignee: Welded Products, Inc., Mishawaka, Ind.

[21] Appl. No.: 76,680

[22] Filed: Jul. 23, 1987

[51] Int. Cl.$^4$ .............................................. B60N 1/00
[52] U.S. Cl. ................................. 296/65.1; 248/503.1
[58] Field of Search ................ 296/65 R, 63; 297/15; 248/503.1, 501

[56] References Cited

U.S. PATENT DOCUMENTS

| | | | |
|---|---|---|---|
| 1,732,169 | 10/1929 | Provost | 297/331 |
| 1,735,518 | 11/1929 | Valkenburg | 248/430 |
| 1,957,004 | 5/1934 | Smith | 297/326 |
| 3,453,025 | 7/1969 | Grant | 297/313 |
| 3,915,493 | 10/1975 | Brown | 296/63 |
| 3,933,330 | 1/1976 | Gwin | 248/371 |
| 4,122,571 | 10/1978 | Moeser | 248/503.1 |
| 4,178,037 | 12/1979 | Pickles | 297/326 |
| 4,372,607 | 2/1983 | Mizushima | 297/421 |
| 4,484,779 | 11/1984 | Suzuki | 297/326 |
| 4,529,159 | 7/1985 | Terada | 297/325 |
| 4,606,577 | 8/1986 | Hirama | 297/331 |
| 4,627,656 | 12/1986 | Gokimoto | 296/65 R |
| 4,636,003 | 1/1987 | Sribler | 297/326 |

FOREIGN PATENT DOCUMENTS

| | | |
|---|---|---|
| 0069207 | 4/1982 | European Pat. Off. . |
| 0136763 | 10/1984 | European Pat. Off. . |
| 2753307 | 5/1979 | Fed. Rep. of Germany ... 248/503.1 |
| 2833454 | 2/1980 | Fed. Rep. of Germany . |
| 1448991 | 11/1966 | France . |
| 555008 | 1/1957 | Italy . |
| 56-50820 | 8/1981 | Japan . |
| 2155780 | 10/1985 | United Kingdom . |

Primary Examiner—Robert R. Song
Attorney, Agent, or Firm—Barnes & Thornburg

[57] ABSTRACT

A detachable van supporting arrangement is disclosed which allows a seat structure to tip into a forward direction and also allows an individual to easily remove the seat from the vehicle without the use of tools. The locking mechanism uses two slots in a base plate communicating with two rods in a tube plate to lock the seat into a secure position. The first rod is inserted in a U-shaped slot with a detention at a bottom portion which provides a pivot point. The U-shaped slot allows the seat to be easily removable from the vehicle by lifting the rod out of the slot. The second rod associates with a L-shaped slot. The first and second rods are connected by links. An over-center locking mechanism moves the rods within the designated slots. The second rod includes a handle. Rotation of the handle moves the two rods against stop means and continued rotation cause the over-center locking mechanism to move beyond the point of eccentricity and provide a snap lock.

24 Claims, 2 Drawing Sheets

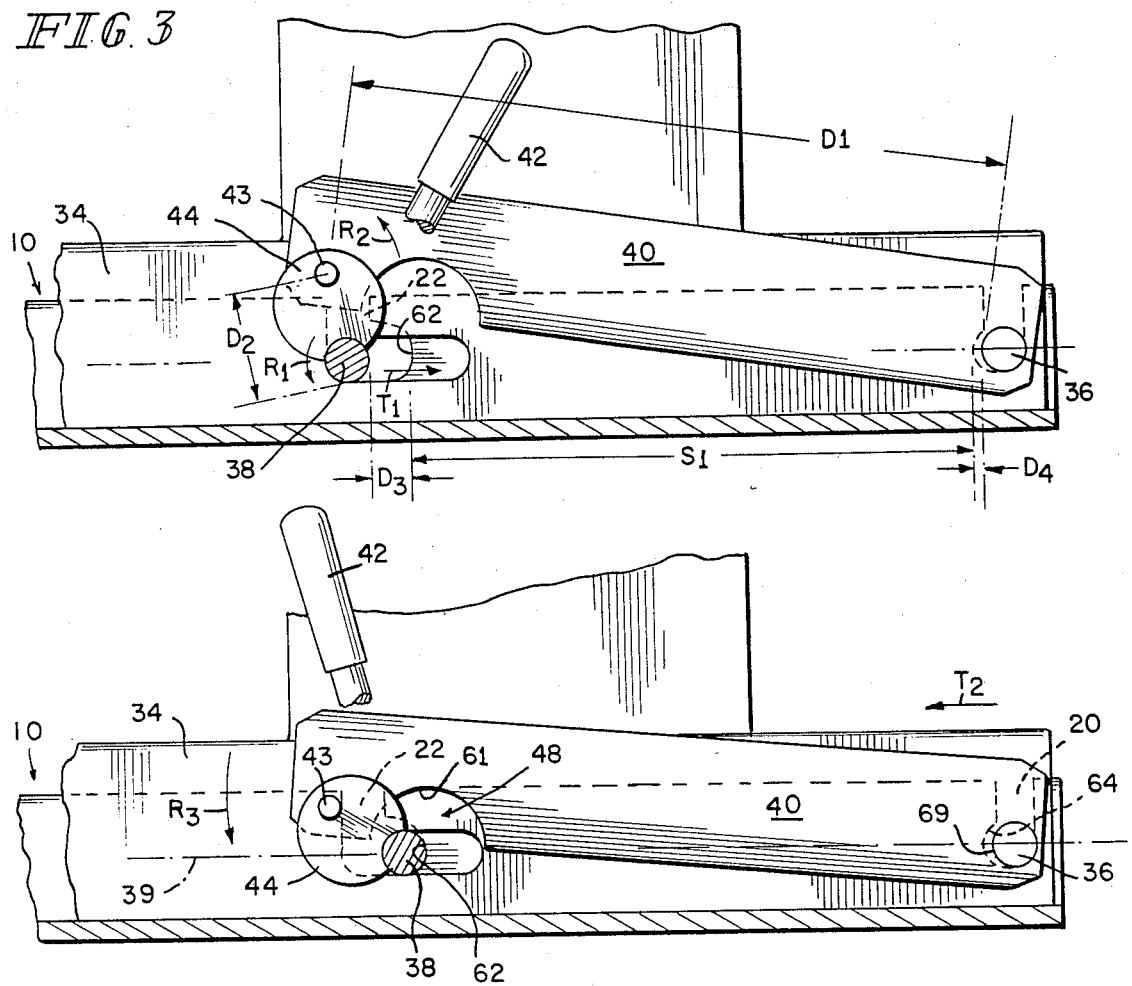
FIG. 3
FIG. 4
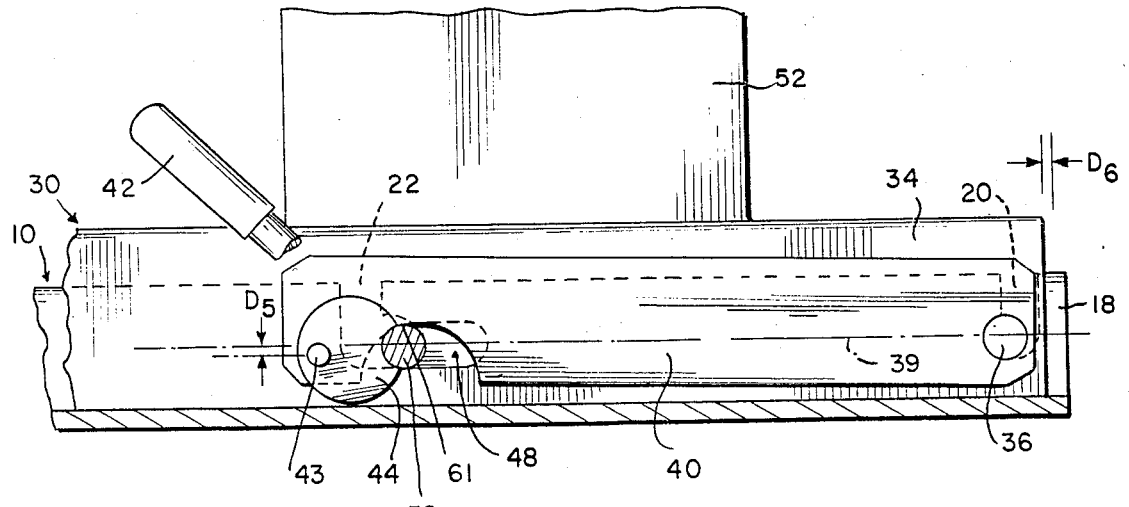
FIG. 5

DETACHABLE VAN SEAT

BACKGROUND AND SUMMARY

Seats have been attached to vans using numerous styles of attachment members. Many of the attachment members allowed seats to pivot out of the position used for driving. Other seats have been designed to be easily removable from the vans by unlatching and/or unbolting the seat. However, these seats are typically designed to be either folding seats or removable seats.

The seat attachment members of the past have oftentimes utilized springs to hold a hook into the latched position. In order to disengage the seat, the biasing force of the spring had to be overcome. As the spring became worn, the latch could bounce out of position allowing the seat to become disengaged.

Many seats tended to use complicated latching mechanisms to provide a positive lock of the seat in the appropriate position. As technology progressed, mechanisms for moving seats to a variety of positions became motorized. This allowed the latching means to become automated as well.

It is, therefore, an object of the present invention to provide a new and improved detachable van seat.

It is a further object of the present invention to provide a van seat that locks in position by frictional engagement of the members without the use of automation.

It is a further object of the present invention to provide a van seat that is both pivotable and easily removable from the van without the need for tools.

It is yet another object of the present invention to provide a van seat that is easily inserted into the van.

It is yet another object of the invention to allow a seat arrangement that is easily removable and leaves a substantially flat portion of the van for storage or hauling items.

It is yet another object of the present invention to provide a van seat that locks into a driving position without the use of springs.

It is yet another object of the present invention to provide a locking means using an eccentric or over-centering loading that allows a rod to move linearly in a slot as the handle of the rod is rotated about the longitudinal axis of the rod.

It is yet another object of the present invention to provide a locking means for attaching a van seat to a floor of a van using an eccentric or over-center loading to provide a positive snap lock so that vibration and other external forces do not inadvertently unlock the seat mechanism.

It is a further object of the invention to provide a locking mechanism for attaching two parts to each other using an eccentric or over-center loading attached to a rod on one end and a link member on the other end whereby rotational motion of a handle connected to the rod is translated into substantially linear motion of the rod and link.

It is a further object of the invention to provide an over-center lock where two rods are moved to a latching position by the movement of one handle.

These and other objects of the present invention are attained by a provision of a detachable seat arrangement or pedestal which allows an upper portion of the seat supporting apparatus to both pivot about a rod-like member and also be easily detachable from the van without the use of tools. The pivoting allows easier access to parts of the vehicle and increases storage space. The novel locking means includes two rods attached to a tube plate. These rods are insertable into two slots of a base plate and movement at least one rod secures the tube plate to the base plate.

The first rod is insertable into a substantially U-shaped slot while the second rod is insertable into a substantially L-shaped slot and has a handle connected on one end. A link connects the first rod to the second rod on each side of the tube plate. The second rod is attached to two circular discs acting as drive cranks or levers which are in turn attached to the two link members. The second rod is attached to each disc near an outer edge of each disc and the link is connected near an edge of the disc opposite the edge where the rod is connected. This connection allows rotational movement of the rod handle to cause a substantially longitudinal linear motion of the rod within the L-shaped portion of the slot. Over-centering loading associated with stops provides a snap-action lock using tension forces of the rods within the slots. The U-shaped slot includes a a slight indentation opening towards the direction of the L-shaped slot. This indentation provides a lock of the rod as the handle and link urge the rod into this indentation. The vertical component of the rotational motion is taken up as the link member pivots about the first rod member and moves downwardly in a substantially vertical direction. Thus, rotational motion of the handle causes substantially longitudinal or horizontal movement of the rod and substantially vertical motion of the links. The tube plate and floor plate are locked together by frictional forces as the rod moves beyond a point of eccentricity in relation to the pivotable connection between the rod and links. In other words, a single lever control is used for attachment and over-center loading and latching of two connecting rods.

The invention provides a simple latching means to hold a seat in the vehicle and a pivoting means to tip the seat forward. The pivoting means allows the seat to be easily removable from the vehicle body simply lifting the first rod out of the substantially U-shaped slot. The eccentric or over-center locking means can be readily used to attach a number of objects to each other.

Other objects, advantages, and novel features of the present invention will become apparent from the following detailed description of the invention when considered in conjunction with the acompanying drawings.

BRIEF DESCRIPTION OF THE DRAWINGS

FIG. 3 is a side view with portions broken away of the latching means in a position after initial insertion of the rods into the slots and prior to rotation of the handle.

FIG. 4 is a side view with portions broken away showing partial rotation of the handle.

FIG. 5 is a side view with portions broken away of the seat in a locked position illustrating the eccentric or over-center loading which provides the snap action lock.

DETAILED DESCRIPTION OF THE DRAWINGS

Figure 1:
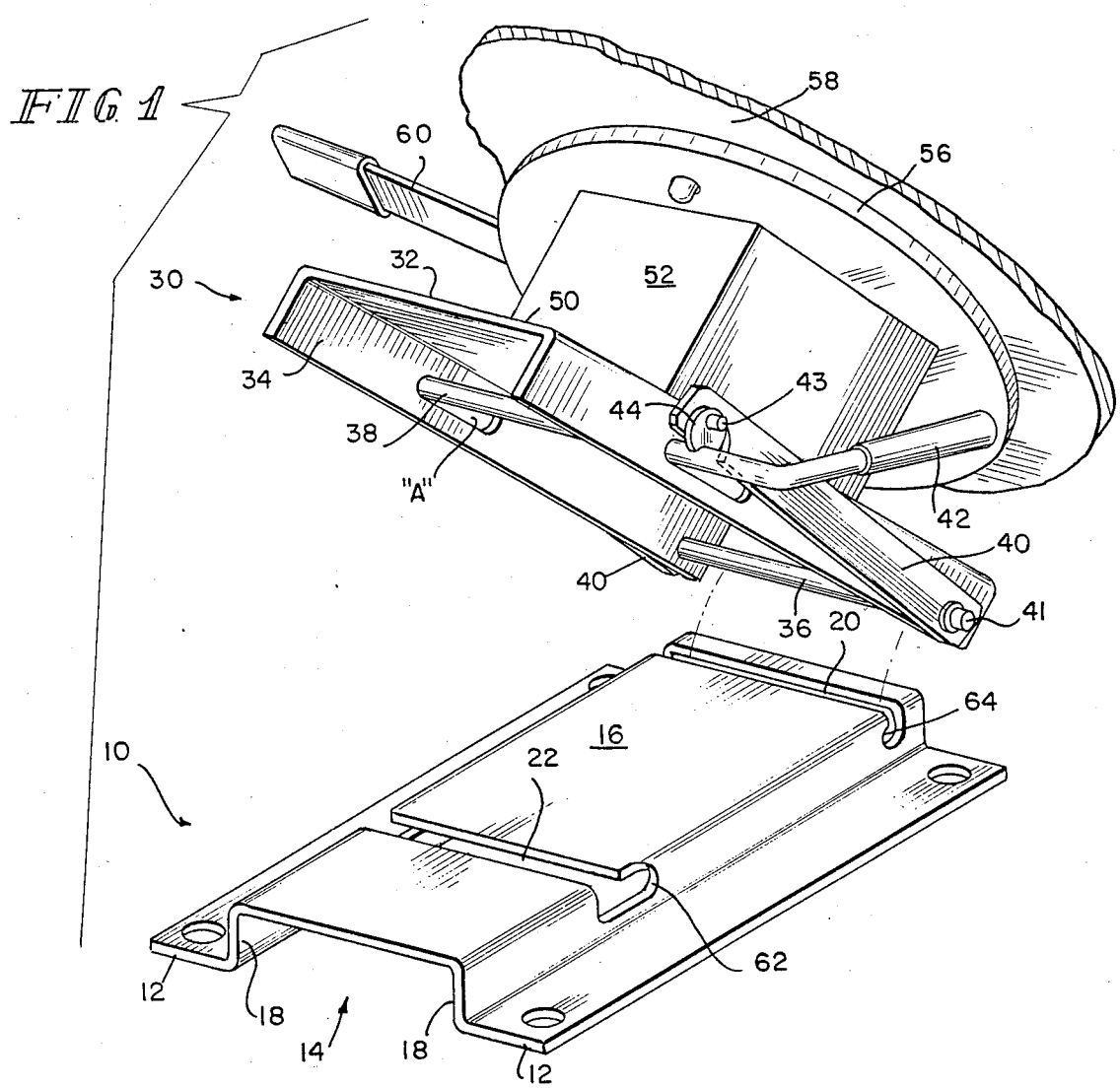
FIG. 1 is a schematic view showing the detachable seat supporting arrangement in a position prior to insertion into the floor plate.
Figure 2:
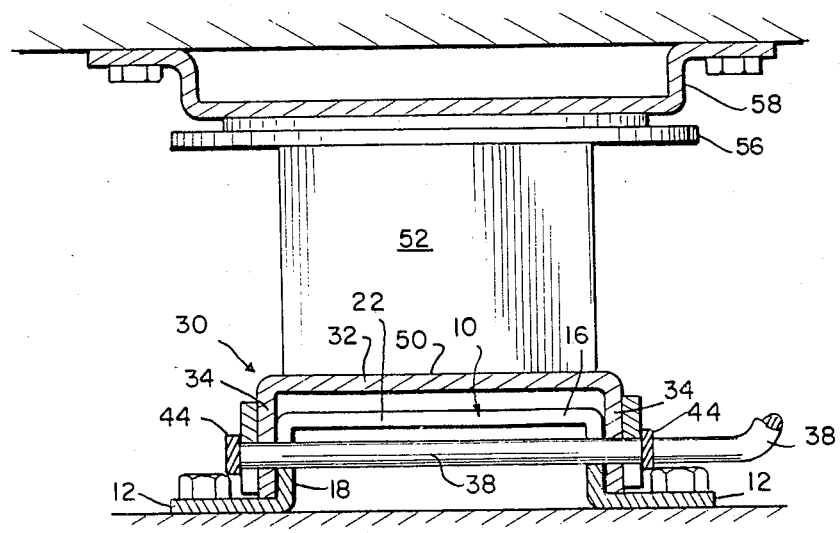
FIG. 2 is a sectional view of FIG. 1 showing a rear view of the seat in a locked position.

FIG. 1 discloses a detachable seat supporting structure 1. The seat supporting structure is attached to the floor of a motor vehicle by bolting or welding a floor plate 10 to the vehicle. In a preferred embodiment, the floor plate includes two flush portions 12 connected to a channel-like middle section 14. The middle channel-like section includes a web 16 and two arms 18.

The floor plate 10 has two slots 20 and 22 to engage the seat supporting mechanism. Slot 20 is substantially U-shaped and is open entirely across the upper web 16 of the channel-like structure 14. Slot 20 includes an indentation 69 at the bottom of the slot 20 in the direction of slot 22. This indentation 69 makes the shape of the slot somewhat J or backward L-shaped. Slot 20 is open at the top of arms 18 and is closed at a lower portion of arms 18 near the bottom of arm 18. A rod-like member can be held in a position within the indentation or notched portion of the slot. The fixed rod 36 thus moves into and out of the indentation during the latching and unlatching operation.

The L-shaped slot 22 is also entirely open across web 16. The top of the slot is open on arms 18 and opens downward towards the bottom of arms 18. The bottom portion of the L is substantially parallel to the floor and is closed at the toe in the direction of slot 20.

The tube plate 30 is substantially channel shaped and includes a web member 32 and two arms 34. The width of the web member 32 is slightly larger than the web member 16 of the floor plate so that the tube plate can overlap the floor plate. The tube plate is associated with two rods 36 and 38. The front rod or first rod 36 is fixedly attached to arms 34 of the tube plate and allows a pivotable engagement of link members 40 on the outside portion of the arms 34 of the tube plate. The rod is provides with a washer located between the tube plate and the link and has caps 41 on the end of the rod. These caps hold the links in proper position in relation to the tube plate. This connection allows the links 40 to rotate about the rod 36.

The second rod 38 is rotatable and movable linearly along a longitudinal axis or in other words within slot "A" located in the arms 34 of the tube plate. Both rods 36 and 38 extend beyond the link members. On one side, rod 38 extends outwardly to form a handle. Rod 38 is bent at an angle of approximately 70° so that a handle 42 is formed to maneuver the eccentric or over-center locking mechanism.

The rod-like structure is fixedly secured to two discs 44 at locations outside of the arms 34 of tube plate 30. The rod with the two discs attached is connected to two link members 40. Specifically, the rod is welded to two discs on one circumferential edge of the discs. The discs are connected to the links 40 near an opposite circumferential edge so that the rod can pivot about the connection between the discs and the links 40. In this manner the drive is essentially a bell crank. The discs are connected to the links 40 in the following manner: protrusions 43 on the links 40 engage holes in the discs. The discs are fixedly spaced apart since they are welded to rod 34. This welding holds the discs in position so that the protrusions from the links provide a pivotable connection with the hole in the discs. The protrusions provide a pivot post extending from link 40.

The links include openings 48 so that as the link members are rotated about the first rod in the direction R3 and the distal ends move downwardly in a vertical direction, the links move into a position where the second rod is completely within the openings 48 in the links and the upper surfaces 61 of the openings act as a stop means preventing the rotation of the rod from turning beyond a predetermined point. This stop means could be provided for in numerous ways.

The second rod includes at least one handle on one end of the rod. As the operator turns on the handle, rotational movement of the handle in the direction R2 is translated into substantially horizontal motion of the rod and substantially vertical motion of the link in the direction R3. The locking means is constructed in a manner so that as the rods are pulled together the point of eccentricity of the rotation of the rod about the protusion on the links is provided when the second rod is near the toe of the L slot and the first rod is in the indenture of the U slot. A positive lock is provided as the rotation goes beyond the point of eccentricity. The stop means 61 on link 40 prevent the locking means from moving too far past the point of eccentricity. This operational aspect of the invention will be discussed later in the specification as the operation of a single lever control for attachment and over-center loading and latching of two rods.

On an upper surface 50 of the channel-like tube plate, a pedestal 52 is welded into position. In a preferred embodiment, the pedestal is in the shape of a tube. Other shapes of the pedestal could be used such as a circular or oval pedestal.

On the upper portion of the pedestal, a round circular plate 56 is provided to act as a base for swiveling the upper portion of the seat assembly allowing easier access for individuals. The seat mounting bracket 58 is attached above the circular top of the pedestal. Between the seat mounting brakcet 58 and the round upper member 56, a plastic sliding circular guide provides a slippery surface allowing the seat mechanism to rotate or swivel about the longitudinal axis of the pedestal. A bolt (not shown) protrudes from the upper surface of the round circular plate and moves through a center portion of the seat bracket allowing the mounting bracket to be fixedly attached to the pedestal. A nylon washer is provided to allow sliding engagement between the seat mounting bracket and the round pedestal and a lock nut is provided to ensure a tight connection. A handle 60 associated with a spring means which connects to a protrusion pushing against the round circular base is provides as a locking means. In an area where the seat is facing in a driving direction, a slot opens thereby communicating with the protrusion on the bottom of the arm to fixedly secure the swiveling seat in a driving position. This type of rotational seat connecting means has been used before by applicant and others in this industry.

FIG. 3 through FIG. 5 disclose the operation of the single lever control for attachment and over-center loading and latching of the two rods 36 and 38. As seen in FIG. 3, the rear rod 38 is in position prior to rotation of the handle 42. The handle 42 is rotated counterclockwise in the direction R2 thus rotating second or rear rod 38 counterclockwise in the direction R1. The rotation of the handle in the direction R2 and the rod in the direction R1 causes drive cranks or discs 44 to orbit in a counterclockwise direction R2 around rod 38 since they are welded to each other.

Since the distal end of the disc is pivotable about protrusion 43, also referred to as a pivot post, and rod 38 is free to move in the opening "A", (to the right is FIG. 3), the rod 38 will now move in the direction designated T1. Opening "A" is the slot in the tube plate and is not to be confused with slot 22 of the base plate. The link 40 pivots about rod 36 in the direction of R3 which because of the small radius is substantially vertical movement.

As the handle is rotated further, as seen in FIG. 4, the rod encounters first stop face 62 in the toe of L slot 22. Rod 38 is thus against the back of the L shaped cut out in the base plate 10. As this happens, link 40 has moved downwardly in the direction designated R3 in FIG. 4. Further rotation of the handle 42 will further rotate rod 38, but since it is at rest against first stop face 62 and coupled via drive crank discs 44 and pivot pin protrusion 43 through link 40 to the first rod 36, which is limited to horizontal movement due to the backward L shaped slot or J shaped slot 20, it will force rod 36 to move to the left in FIG. 4 until rod 36 comes to rest against second stop face 64 in the indentation of the slot 20 causing the entire tube plate 30, seat, and driver to move in direction T2 approximately 1/16". Stop face 64 in the face on the indentation 69.

At this point of the latch function, the pivot post or protrusion 43 attached to link 40 is above, yet approaching the center line 39 or point of eccentricity. As seen in FIG. 5, further clockwise rotation or rod 38 using considerable force will cause the post to pass through the centerline 39 until a heel or stop means 61 in link 40 comes in interference contact with rod 38, thus stopping the downward movement of the link. As can be seen in FIG. 5, the post 43 is below centerline 39 as indicated by D5 and the tube plate 30 has moved on the base a distance D6 which is equal to distance D4 in the indentation in slot 20. The tube plate is now trapped in the indentation of slot 20 as a result of the two rods being latched in the slots 22 and 20 and the pivot pin in an over-center condition relative to rod 36, rod 38, drive disc 44, and the stop faces 62 and 64.

All of the above parts and members are in tension and tight as a result of D1 minus D2 being less than the space S1 between the first stop face 62 and the second stop face 64. It should be noted the pivot rod 36 is movable horizontally at the next to last movement to also provide a latching condition for itself. So the mechanism actually latches two rods with the movement of one handle.

The present invention is to be limited only by the terms of the appended claims.

What is claimed is:

1. A seat mounting assembly for a motor vehicle which allows a seat to be both tilted out of a driving position and easily removed from the vehicle without the need for tools, comprising;
    a floor plate;
    a tube plate;
    a latching means for securing said tube plate to said floor plate;
    said floor plate having two edges for bolting to a floor of the vehicle and a raised portion in the shape of a channel with legs and a web, said legs connected to the edges of the floor plate;
    said floor plate having a first slot and a second slot substantially perpendicular to the longitudinal axis of the the floor plate and extending across the entire width of the web of the channel and legs having a top portion of each slot open and each slot extending downwardly from the channel web towards a far edge of the channel legs;
    the first slot having a substantial U-shape with a slight indentation in the direction of the second slot;
    the second slot having an L-shape with the top of the L open across the entire web of the channel and a bottom toe of the L in the direction of the first slot;
    said tube plate being channel shaped with a web portion slightly wider than the web portion of the floor plate so that the tube plate overlaps said floor plate;
    said latching means attached to said tube plate including, a first rod, a second rod with a handle, two link elements connecting said first and second rods, and two discs attaching to said links and attaching to said second rod to form an eccentric pivoting means.
    said first rod extending through the legs of the tube channel and engaging the first slot of the floor plate, said link elements secured to said first rod;
    said second rod extending through the legs of the channel, a handle attached to one end of the second rod to facilitate rotation of said second rod, said second rod welded to two circular discs outside of the link elements, the discs being parallel to the longitudinal axis of the links and have openings to attach to protrusions extending outwardly from the link;
    said discs operating as part of a bell crank mechanism allowing linear movement of said second rod in a direction inwardly in a closed bottom portion of the L slot of the floor plate towards the first rod; and
    a frictional over-center lock means whereby the rods pull towards each other from the pivotable movement of the link and circular discs.

2. The seat supporting arrangement according to claim 1 wherein:
    a pedestal is connected to said tube plate and a seat mounting bracket is attached to said pedestal.

3. A detachable seat supporting arrangement for a vehicle comprising:
    a first plate means for attachment to a seat;
    a second plate means for attachment to a vehicle;
    a first and second rod means in one of said first and second plate means;
    a first and second openings in the other of said first and second plate means; and
    a means for displacing said first and second rod means relative to each other in said first and second openings to removably secure said first and second rod means in said first and second openings.

4. The seat supporting arrangement of claim 3 wherein at least one of said first and second opening has a slot extending at an angle from said opening for engagement of at least one of said first and second rod means.

5. The seat supporting arrangement of claim 4 wherein:
    said first slot is substantially U-shaped with an indentation towards said second slot; and
    said second slot is L-shaped with the horizontal reach of said L-shaped second slot projecting towards said first slot and terminating in a toe portion.

6. The seat supporting arrangement of claim 3, further including a latching means for securing at least one of said first and second rod means in at least one of said first and second openings.

7. The seat supporting arrangement of claim 6 wherein said latching means includes an over-center locking means.

8. The seat supporting arrangement of claim 6 wherein said displacing means and said latching means include, on each opposite side of one of said first and second plate means, a first link pivotably connected at a first end to one of said first and second plate means and an eccentrically mounted disk connected at a second end to one of said first and second rod means.

9. The seat supporting arrangement of claim 3 wherein said first opening has a first slot extending at an angle from said first opening to secure said first rod means and said second opening has a second slot extending at an angle from said second opening to secure said second rod means.

10. The seat supporting arrangement of claim 9 wherein:
said first slot is substantially U-shaped with an indentation towards said second slot; and
said second slot is L-shaped with the horizontal reach of said L-shaped second slot projecting towards said first slot and terminating in a toe portion.

11. The seat supporting arrangement of claim 10, further including a latching means for securing at least one of said first and second rod means in at least one of said first and second openings.

12. The seat supporting arrangement of claim 11 wherein said latching means includes an over-center locking means.

13. The seat supporting arrangement of claim 12 wherein said latching means includes at least one pivotable link for connecting said first and second rod means to one another.

14. The seat supporting arrangement of claim 12 wherein said displacing means and said latching means include, on each opposite side of one of said first and second plate means, a first link pivotable connected at a first end to one of said first and second plate means and an eccentrically mounted disk connected at a second end to one of said first and second rod means.

15. The seat supporting arrangement of claim 14 wherein said first end of said first link is pivotably connected to one of said first and second rod means.

16. The seat supporting arrangement of claim 15 wherein a handle is attached to said second rod means for rotation of said second rod means.

17. The seat supporting arrangement of claim 16 wherein rotation of said handle moves said first rod means and said second rod means into positions against stop means to secure one of said first and second plate means to said other plate means.

18. The seat supporting arrangement of claim 17 wherein said stop means include:
a first stop means provided at said toe of said L-shaped second slot; and
a second stop means provided at said indentation of said U-shaped first slot.

19. The seat supporting arrangement of claim 18 wherein:
a third stop means on at least one of said first and second links restricts movement of said over-center locking means to a pre-determined point whereby tensile forces create a snap lock of said over-center locking means.

20. A detachable seat supporting arrangement for a vehicle, comprising:
a plate means for attachment to a vehicle;
a first and second rod means for attachment to a seat;
at least two openings in said plate means;
a first and second slots extending at an angle from said openings for engaging of said first and second rod means; and
a means for displacing said first and second rod means in said first and second slots relative to said openings to removably secure said first and second rod means in said first and second slots.

21. The seat supporting arrangement in claim 20 further including a latching means securing said plate means to at least one of said first and second rod means.

22. The seat supporting arrangement of claim 21 wherein said latching means includes an over-center locking means.

23. The seat supporting arrangement of claim 22 wherein rotation of a handle attached to said second rod means moves said first rod means and said second rod means into positions against stop means to secure said first and second rod means to said plate means.

24. The seat supporting arrangement according to claim 20 wherein:
said first slot in said plate means is substantially U-shaped with an indentation towards said second slot; and
said second slot in said plate means is L-shaped with the horizontal reach of said L-shaped second slot projecting towards said first slot and terminating in a toe portion.

* * * * *

UNITED STATES PATENT AND TRADEMARK OFFICE
CERTIFICATE OF CORRECTION

PATENT NO. :   4,805,952
DATED      :   February 21, 1989
INVENTOR(S) :  Jack E. Coleman It is certified that error appears in the above-identified patent and that said Letters Patent is hereby corrected as shown below:

In column 2, at line 42 of the patent, please delete "body" and insert therefor --by--.

In column 5, at line 27 of the patent, please delete "or" and insert therefor --of--.

In claim 4, line 2 of the patent, please delete "opening" and insert therefor --openings--.

In claim 14, line 4 of the patent, please delete "pivotable" and insert therefor --pivotably--.

In claim 21, line 1 of the patent, please delete "in" and insert therefor --of--.

Signed and Sealed this

Fourteenth Day of November, 1989

*Attest:*

JEFFREY M. SAMUELS

*Attesting Officer*     *Acting Commissioner of Patents and Trademarks*